P. DAIMLER.
GEARING.
APPLICATION FILED OCT. 25, 1906.
1,192,277. Patented July 25, 1916.
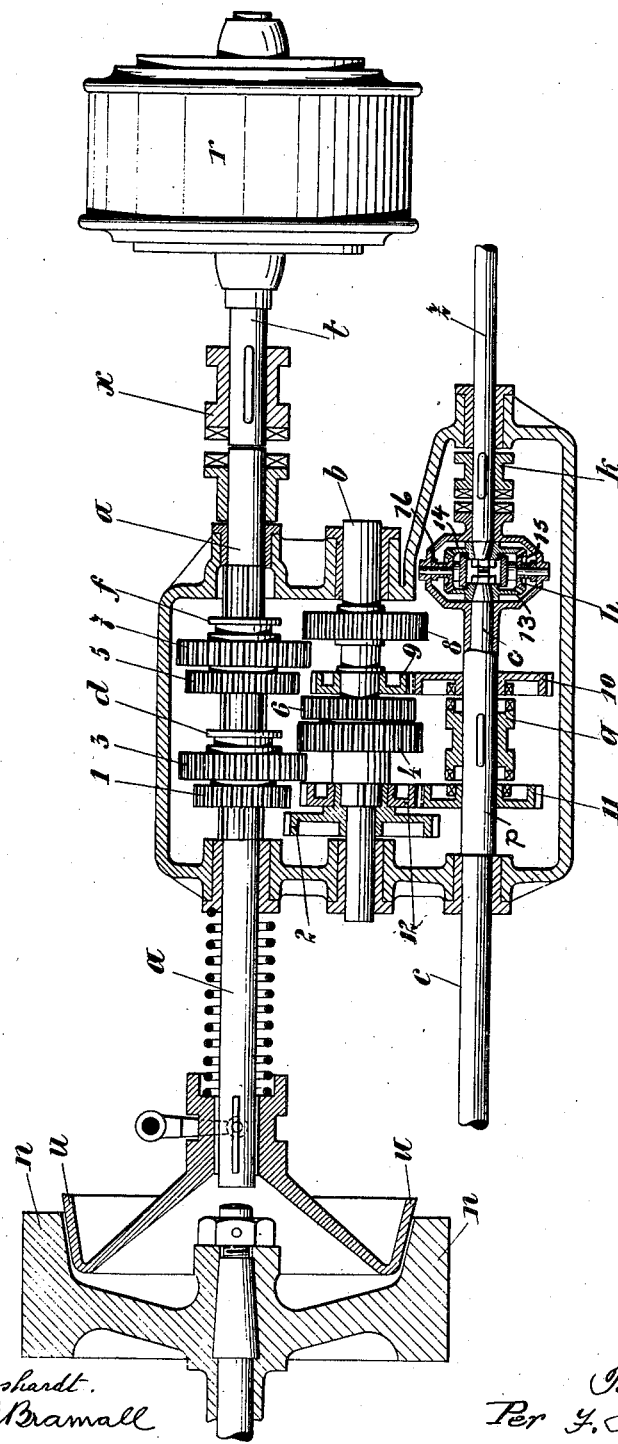

UNITED STATES PATENT OFFICE.

PAUL DAIMLER, OF UNTERTÜRKHEIM, GERMANY, ASSIGNOR TO THE FIRM OF DAIMLER MOTOREN-GESELLSCHAFT, OF UNTERTÜRKHEIM, NEAR STUTTGART, GERMANY.

GEARING.

1,192,277.     Specification of Letters Patent.     Patented July 25, 1916.

Application filed October 25, 1906. Serial No. 340,548.

*To all whom it may concern:*

Be it known that I, PAUL DAIMLER, citizen of the Empire of Germany, residing at Untertürkheim, in the Kingdom of Wurttemberg, Germany, have invented certain new and useful Improvements in Gearing, of which the following is a specification, reference being had therein to the accompanying drawing.

This invention relates to improvements in gearing for motor vehicles carrying light generating machines, pumps and the like and consists in arranging the shaft of the electric machine or pump in alinement with the first shaft of the speed varying mechanism and driving the front and back wheels of the vehicle by two shafts in alinement with each other situated below the speed changing mechanism or second shaft thereof coupled with the latter by means of two carrier wheels adapted to be brought in and out of gear whereby the number of speeds imparted to the front and back wheels of the vehicle is multiplied compared with the mechanism hitherto known. The low positions of the said two shafts underneath the second shaft of the speed changing mechanism permits of bringing them directly underneath the fly wheel forward and backward underneath a machine on the motor vehicle, the driving shaft of which is in alinement with the first shaft of the speed changing gear and can therefore be driven directly from the latter by means of a coupling. Hitherto in speed changing mechanism where already the second shaft of the speed changing mechanism is brought backward there is insufficient room above this shaft to arrange the shaft of the dynamo or pump in alinement with the first shaft, it is equally impossible to bring this shaft forward because its extension would meet the fly wheel. I attain this object by the means illustrated in the accompanying drawing which shows principally a longitudinal section.

Referring to the drawing, the power generated by the motor is in the usual way transmitted from the fly wheel $n$ provided with the friction clutch $u$ upon the first shaft $a$ of the speed changing mechanism; the latter has as usual two slidable sleeves $d$, $f$ each carrying a wheel 1, 2 and 5, 7 respectively, while on the second shaft are keyed four wheels, 2, 4, 6, 8 of varying diameters arranged as usually so that by displacing the sleeve $d$ or $f$ to the left or right, the wheel 1 will be brought into gear with the wheel 2, or 3 with 4, or 5 with 6, or 7 with 8, each of the said positions corresponding with a certain speed of the second shaft. This arrangement is old and is only mentioned in order that the present invention will be better understood.

Upon the shaft $b$ are further mounted two wheels 9 and 12 and upon the shaft $c$ loosely the sleeve $p$. Upon the sleeve $p$ are loosely mounted the two wheels 10 and 11, the wheel 11 being in gear with the wheel 12 and the wheel 10 with the wheel 9 of the shaft $b$. The wheels 12 and 11 are of equal diameter while that of 9 and 10 may be increased or reduced as may be found necessary. The clutch coupling $g$ slidable on the sleeve $p$, permits of connecting at will with the sleeve $p$, one or the other of the two wheels 10 and 11. Hence after having brought into gear one of the two wheels 10, 11, the sleeve $p$ will be driven; the latter transmits motion to the differential gear casing $h$ and this rotates the two shafts $c$ and $z$, the well known action of the differential gear however causing the shaft $z$ to run at a less speed than the shaft $c$ as is required, when taking acute curves or turning the car, at which time the distance traveled by the front wheels and the distance traveled by the back wheels are unequal.

In order to permit of disconnecting the differential gear when desired, a clutch $k$ is arranged upon the shaft $z$, which when engaged connects together the shaft $z$ and the differential gear casing. It will thus be seen, that the shafts $c$, $z$ are driven from the sleeve $g$ either with or without the differential gear in operation and as the sleeve $g$ may not only be rotated at any of the four speeds which the second shaft $b$ has, but at four further speeds obtained through the wheels 9 and 10, it follows that the shafts 9 and 10 can be driven at eight different speeds. Between the shafts $z$ and $c$ differential gearing $h$ and a clutch coupling $k$ are arranged. The shaft $z$ transmits motion to the back wheels while the front wheels are driven from the shaft $c$. Owing to the low position of the shaft $z$ extending to the back wheels it is, as previously mentioned, possible to so employ above this shaft a pump or a dynamo $r$, as shown in the drawing, that the shaft $t$ carrying the armature is in alinement with the top shaft $a$ of the speed changing mechanism and can be coupled therewith by means of a clutch $x$.

As will be seen from the drawing, by driving the vehicle from shafts $c$ and $z$ instead of as hitherto from the second shaft $b$, not only the back wheels can be driven from the shafts $c$, $z$ but also the front wheels as the shaft $c$, is situated so low that it can be carried underneath past the fly wheel which is a great advantage; apart from this the distance between the shafts $c$, $z$ and the shaft $a$ permits also that a machine $r$ on the motor vehicle may be arranged in alinement with the shaft $a$ which very much facilitates the driving of the said machine.

I claim:

In a motor driven vehicle, a driving shaft, a motor shaft for driving said shaft, a fly wheel carried by said motor shaft, an intermediate shaft beneath said driving shaft and in vertical alinement therewith, a first driven shaft arranged in vertical alinement with said driving shaft and intermediate shaft and extending beneath said fly-wheel, a second driven shaft extending in axial alinement with said first driven shaft and in a direction opposite thereto, a differential gearing connecting both of said driven shafts, and change speed gearing operatively connecting said driving and intermediate shafts and said differential gearing.

In testimony whereof I hereunto affix my signature in presence of two witnesses.

PAUL DAIMLER.

Witnesses:
ROBERT UHLAND,
ERNST ENTENMANN.